United States Patent
Morley (10) Patent No.: US 9,069,172 B1
(45) Date of Patent: Jun. 30, 2015

(54) MULTI-MODE SIGHT

(76) Inventor: Roland Morley, Phoenix, AZ (US)

( * ) Notice: Subject to any disclaimer, the term of this patent is extended or adjusted under 35 U.S.C. 154(b) by 0 days.

(21) Appl. No.: 13/234,148

(22) Filed: Sep. 15, 2011

Related U.S. Application Data (60) Provisional application No. 61/383,256, filed on Sep. 15, 2010.

(51) Int. Cl.
*H01J 31/49* (2006.01)
*G02B 23/12* (2006.01)

(52) U.S. Cl.
CPC ................. *G02B 23/12* (2013.01); *H01J 31/49* (2013.01)

(58) Field of Classification Search
USPC .......................................................... 250/333
See application file for complete search history.

(56) References Cited

U.S. PATENT DOCUMENTS

| | | | |
|---|---|---|---|
| 3,509,344 A * | 4/1970 | Bouwers | 250/333 |
| 4,561,775 A | 12/1985 | Patrick et al. | |
| 4,658,139 A | 4/1987 | Brennan et al. | |
| 4,936,190 A | 6/1990 | Pilcher, II | |
| 5,035,472 A | 7/1991 | Hansen | |
| 5,084,780 A | 1/1992 | Phillips | |
| 5,272,514 A | 12/1993 | Dor | |
| 5,903,996 A | 5/1999 | Morley | |
| 6,020,994 A | 2/2000 | Cook | |
| 6,121,600 A | 9/2000 | Saldana et al. | |
| 6,204,961 B1 | 3/2001 | Anderson et al. | |
| 7,051,469 B1 | 5/2006 | Pochapsky et al. | |
| 7,057,647 B1 | 6/2006 | Monroe | |
| 7,171,776 B2 | 2/2007 | Staley, III | |
| 7,307,793 B2 | 12/2007 | Ottney et al. | |
| 7,319,557 B2 | 1/2008 | Tai | |
| 7,333,270 B1 | 2/2008 | Pochapsky et al. | |
| 7,345,277 B2 | 3/2008 | Zhang | |
| 7,483,213 B2 | 1/2009 | Pochapsky | |
| 7,541,581 B2 * | 6/2009 | Reed et al. | 250/330 |
| 2002/0180866 A1 | 12/2002 | Monroe | |
| 2005/0268521 A1 | 12/2005 | Cox et al. | |
| 2009/0193704 A1 | 8/2009 | Pochapsky et al. | |
| 2009/0303456 A1 | 12/2009 | Paiva et al. | |
| 2010/0103508 A1 | 4/2010 | Pochapsky | |

FOREIGN PATENT DOCUMENTS

| | | |
|---|---|---|
| EP | 1967814 | 9/2008 |
| JP | 2003130589 | 5/2003 |

* cited by examiner

*Primary Examiner* — David Porta
*Assistant Examiner* — Edwin Gunberg
(74) *Attorney, Agent, or Firm* — Booth Udall Fuller, PLC (57) ABSTRACT

A multi-mode sight includes an optical sight that provides a direct view image of an aiming point or reticle superimposed on a target scene. The optical sight includes a single optical path defined through the sight comprising a direct view and overlay path. A thermal imager provides a monochromic thermal image of the target scene. A single combiner is located in the optical path and passes the direct view image and reflects the thermal image to overlay the thermal image onto the direct view image for an operator to see as a superimposed thermal and direct view optical image of the target scene together with the aiming point or reticle.

6 Claims, 6 Drawing Sheets

MULTI-MODE SIGHT

CROSS REFERENCE TO RELATED APPLICATIONS

This document claims the benefit of the filing date of U.S. Provisional Patent Application Ser. No. 61/383,256, entitled "MULTI-MODE SIGHT", filed Sep. 15, 2010, the entire disclosure of which is hereby incorporated herein by reference.

BACKGROUND

1. Technical Field

This document relates to a multi-mode sight.

2. Background

Conventional aiming sights include non-magnified (1×) aiming sights such as a reflex (red-dot) aiming sight, as well as holographic aiming sights, and superimpose an aiming reticle on the view of a target scene during the day-time. Conventional aiming sights for night-time use typically include a thermal imager, an image intensified night vision tube, or a low-light CCD sensor. The target scenes provided by these night-time use aiming sights are displayed on a screen together with an electronically generated reticle.

SUMMARY

Aspects of this document relate to a multi-mode sight. Such a sight may combine a visible light image with an image from a different wavelength, for example, infrared, for use in conjunction with a firearm. Accordingly, a multi-mode sight may be a fused thermal and a direct view aiming sight. The multi-mode sight may generate a direct view image of an aiming point or reticle superimposed on a target scene, as well as a monochromic thermal image of the target scene. A single image combiner passes the direct view image and reflects the thermal image to fuse the thermal image onto the direct view image (overlays a thermal infrared image over a visible light image) for an operator to see as a combined thermal and direct view optical image of the target scene together with the aiming reticle.

These aspects may comprise, and implementations may include, one or more or all of the components and steps set forth in the appended CLAIMS, which are hereby incorporated by reference. The foregoing and other aspects and implementations of a multi-mode sight may have one or more or all of the following advantages, as well as other benefits discussed elsewhere in this document.

Multi-mode sight implementations are lightweight, rugged, and exhibit better performance than existing sights. Multi-mode sight implementations do not require any moving optical elements, no necessary moving mirrors, and no compromise of environmental seals. Multi-mode sight implementations provide the capability for a user to target accurately using imagery either by direct view or with a choice of sensors integrated with a single aiming mark that does not leave the weapon (fused or overlaid images). Multi-mode sight implementations employ a reflex (1×) sight with an electronic reticle (display). Multi-mode sight implementations provide improved target detection with thermal overlay. Multi-mode sight implementations are night vision (NV) compatible. Thus, multi-mode sight implementations may be employed as a combat optic with combined day/night/thermal capability and multiple operating modes. A 3× day scope may be used in place of any NV scope or goggle and visible and IR laser pointers can be integrated as well. Multi-mode sight implementations also allow video in (from a thermal viewer or other video source) for video, text display.

The foregoing and other aspects, features, and advantages will be apparent to those of ordinary skill in the art from the DESCRIPTION and DRAWINGS, and from the CLAIMS.

BRIEF DESCRIPTION OF DRAWINGS

Implementations will hereinafter be described in conjunction with the appended DRAWINGS (which are not necessarily to scale), where like designations denote like elements, and.

DESCRIPTION

There are many features of multi-mode sight implementations disclosed herein, of which one, a plurality, or all features or steps may be used in any particular implementation.

In the following description, reference is made to the accompanying DRAWINGS which form a part hereof, and which show by way of illustration possible implementations. It is to be understood that other implementations may be utilized, and structural, as well as procedural, changes may be made without departing from the scope of this document. As a matter of convenience, various components will be described using exemplary materials, sizes, shapes, dimensions, and the like. However, this document is not limited to the stated examples and other configurations are possible and within the teachings of the present disclosure.

Structure and Operation

There are a variety of multi-mode sight implementations that can receive both a visible light image and an image transmitted in a wavelength other than visible light, convert the image not in visible light to a visible light image, and overlay one image over the other so that they appear to be a single image.

Figure 1:
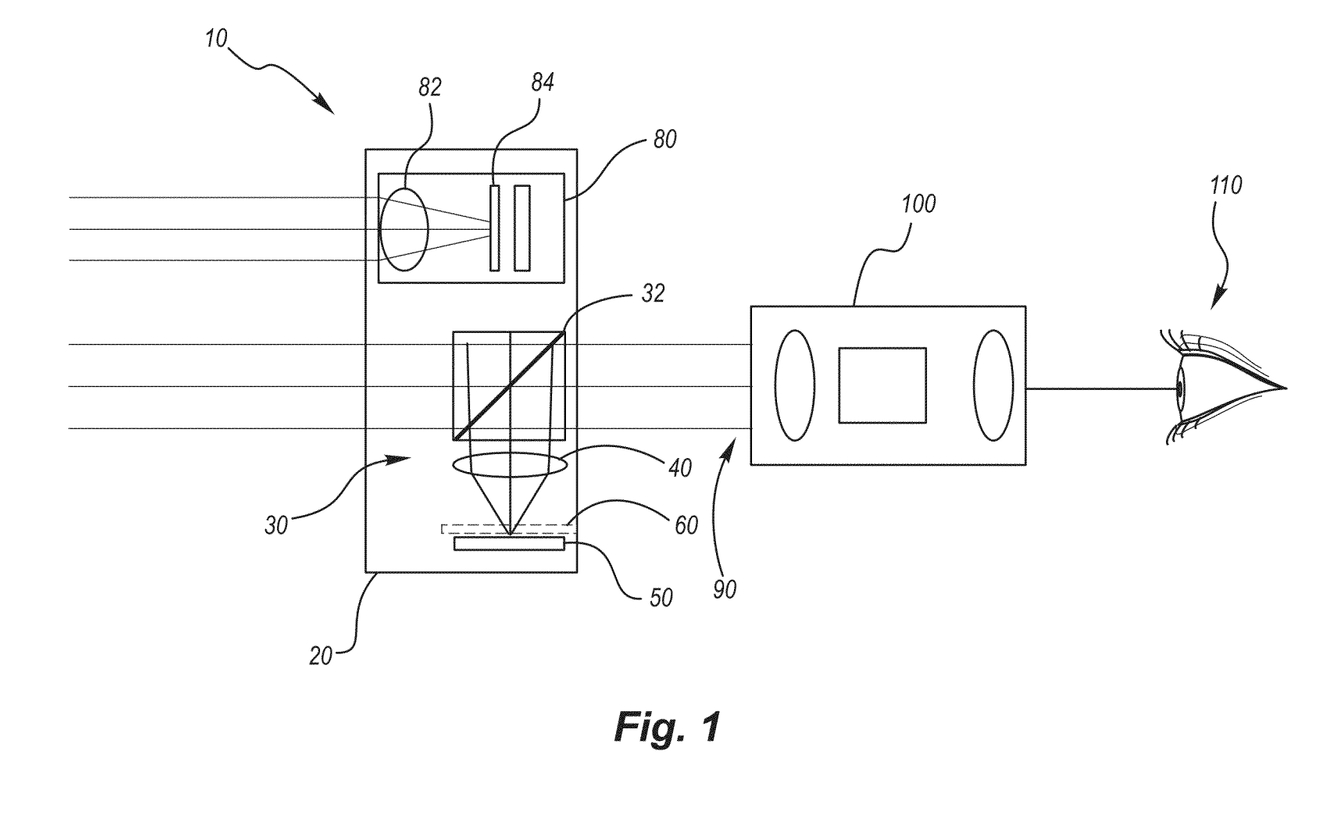
FIG. 1 is a conceptual drawing of a multi-mode sight implementation used with a night-vision scope or goggle for operation at night.

Notwithstanding, for the exemplary purposes of this disclosure and turning to FIG. 1, multi-mode sight 10 is disclosed and may be combat optic for small arms. Multi-mode sight 10 generally comprises an optical sight 20 with a single optical path there through, a combiner 30 in the optical path, a lens 40 adjacent the combiner, a display 50 adjacent the lens, and an integrated thermal imager 80.

Optical sight 20 provides a direct view image of an aiming point or reticle superimposed on a target scene. Optical sight 20 may be any optical sight. For example, optical sight 20 may be a modified version of a non-magnified reflex optical sight (allows the user to look through a partially reflecting glass element and see an illuminated projection of an aiming point or some other image superimposed on the field of view) such as the sight taught in U.S. Pat. No. 3,905,708 which is hereby incorporated by reference in its entirety, or a modified version of a holographic optical sight in which brightness of the aiming reticle is adjustable over a wide range, such as the sights taught taught in U.S. Pat. Nos. 5,483,362 and 6,490,060, which are both hereby incorporated by reference in their entirety.

The single optical path defined through sight 20 may be a direct view and overlay path. The single optical path will not create a likelihood of differences between point of aim and point of impact.

Thermal imager 80 includes thermal imaging processing electronics and a thermal sight for generating a monochromic near infrared or thermal image of a target scene. The thermal image data can be processed such that the thermal image includes targets in the target scene which have a temperature falling within a given temperature range and excludes all other targets in the target scene. The thermal imager 80 is controllable to be turned-off such that the direct view image provided from the optical sight 20 is passed to the exit pupil 90 without a thermal image superimposed thereon when the thermal imager 80 is turned-off.

Thermal imager 80 comprises among other components known in the art a sensor 84 located where it will receive wavelengths of light outside the visible spectrum, for example, infrared. An objective lens 82 is disposed ahead of sensor 84. The entire surface of the objective lens 82 is optimized for the desired wavelength. Objective lenses may be optimized for different wavelengths through both the selection of the material from which the lens is made, and the degree of curvature of the surfaces of the lens.

In some implementations, the thermal imager 80 is a module that can be installed or removed. The mounting provisions for the thermal imager 80 are critical so that boresight is maintained on removal and re-installation.

Thermal imager 80 may be a Long Wave infrared (LWIR) (8 μm to 12 μm) thermal camera component which provides video output to the display 50. In place of the LWIR thermal camera, a similar module using a different sensor, such as Short Wave Infrared (SWIR) thermal camera, lead salt IR image sensors, uncooled or cooled IR image sensors, receivers and/or transmitters for diode or laser diode illumination and/or laser rangefinding or remote communications, transmitters for optical target designation, UV image sensors, CCD or CMOS image sensors, intensified CCD or CMOS image sensors, electron multiplying CCD or CMOS sensors, and visible or intensified image sensors, could be fitted, with similar performance benefits.

In place of a thermal imager, a module with other functionality, such as a laser module, or a laser rangefinder module, could be installed. The laser rangefinder coupled with the fixed reticle can provide ballistic solutions (e.g., a computed aiming mark displayed over the reticle).

Single see-through combiner 30 comprises a mirror/beam splitter 32 and is located/positioned in the optical path. Combiner 30 is non-video based and 1×—no magnification so display 50 overlay's properly. Combiner 30 provides a view of the target scene with or without a super-imposed infinity focused image from display 50. That is, combiner 30 can pass the direct view image of an electronic aiming point or reticle superimposed on a target scene and reflect the monochromic thermal image of the target scene to overlay the thermal image onto the direct view image for an operator to see as a super-imposed thermal and direct view optical image of the target scene together with the aiming point or reticle.

Combiner 30 may be made from two mating components of a cube of glass or other material that is transparent in the wavelength ranges of interest, with the mating surfaces forming an angle of about 45 degrees upon which a dichroic coating is applied. Alternatively, combiner 30 may comprise a plate or pellicle beamsplitter. The use of a single beamsplitter to both split and combine the images makes the viewer insensitive to changes in the positioning of beamsplitter, because any error introduced by misalignment of the front surface of the beamsplitter is automatically corrected by having the back surface of beamsplitter at substantially the same angle. Combiner 30 materials include optical glass, Zinc Sulphide, Zinc Selenide, Sapphire, Fused Silica, Calcium Fluoride, Magnesium Fluoride, Sodium Chloride, Cesium Bromide, Cesium Iodide, Lithium Fluoride, Potassium Bromide, and Thallium Bromoiodide.

Combiner 30 includes dichroic surfaces structured to transmit light of certain wavelengths, for example the visible spectrum, and reflect light having other wavelengths, for example, infrared. Example dichroic coatings include thin film dielectric, ion beam assisted deposition hard dielectric, chemical vapor deposition (CVD) coatings and rugate filters. A front surface may have a dichroic coating that is adapted to transmit visible light. The back surface of the mirror has another dichroic coating applied thereto that is adapted to reflect another portion of the visible spectrum. The combination of the two dichroic coatings on the front and back surfaces of combiner 30 permits an image transmitted by visible light to pass through combiner 30.

Electronic display 50 is viewed by combiner 30. Display 50 may be a miniature SVGA resolution or better (e.g. micro 2-D 880×600 pixels) monochrome display with a fiber-optic faceplate. A moveable electronic aiming point or reticle overlaid on display 50 provides an aiming mark for the weapon user. This moveable electronic aiming point or reticle is at the focus of lens 40. Simply, a projected reticle is bounced off combiner 30 into the user's eye 110. The viewer looking through combiner 30 sees an image of the reticle in front of them that stays in alignment with the device sight 10 is attached to regardless of their eye position, removing most of the parallax error found in simple sighting devices.

Display 50 is structured to display the image received by sensor 84 of thermal imager 80 using a portion of the visible spectrum. Display 50 may be an inverting fiber optic output display, an LCD display, a micro mirror array, a CRT, a plasma display, or an OLED display for example.

Display 50 is located where the image will be reflected by the back surface of combiner 30, along the defined optical path. The display 50 may therefore be positioned so that an image displayed by the display 50 and reflected by the back surface of the combiner 30 will be overlaid upon the visible light image transmitted through the combiner 30. The user may vary the intensity of the image displayed by the display 50, thereby permitting the user to view the visible light image alone, a combined image combining the image from the thermal imager 80 with the daylight image, or the image from the thermal imager 80 alone.

The display 50 may display an image within one portion of the visible spectrum, which the dichroic coating on the rear surface of combiner 30 will be adapted to reflect. The rear surface may be adapted to permit passage of other wavelengths of visible light therethrough. Alternatively, the dichroic coating on the rear surface of the combiner 30 may be adapted to both reflect and permit passage therethrough of the entire visible spectrum, with a certain percentage reflectivity. As another alternative, partial reflectivity and wavelength selectivity may be combined to permit transmission of the visible light image while also reflecting a sufficient portion of the image from the display 50. The combined image is displayed through the output window.

Collimating lens 40 is situated at 90° to the optical path. For the purpose of this description, a lens is optimized for a given wavelength if it is more effective at transmitting and focusing the given wavelength than other wavelengths. Lens 40 and the overlay image or reticle at its focus on display 50 together creates an optical collimator that produces a virtual image of that reticle. The image is reflected off combiner 30 so that the observer (looking through combiner 30) will see the image at the focus of the collimating optics superimposed in the sight's field of view in focus at ranges up to infinity. Since the optical collimator produces a reticle image made up of collimated light, light that is nearly parallel, the light making up that image is theoretically perfectly parallel with the axis of the device it is aligned with, i.e. with no parallax at infinity. The collimated reticle image can also be seen at any eye position in the cylindrical volume of collimated light created by the sight behind the optical window. Eye movement perpendicular to the devices optical axis will make the reticle image move in exact relationship to eye position in the cylindrical column of light created by the collimating optics.

As an optional emergency back-up, a fixed optical reticle 60 may be provided with a separate battery supply. Thus, integrated with the display 50, the fixed optical reticle 60 may be coincident (in close proximity) with the faceplate of the display 50 so that the reticle 60 and display 50 are in the same focal plane. For example, the reticle 60 may only be separated from the faceplate of the display 50 by a few millimeters. A hologram in red light (for example) can also be provided. In this manner, it would be optional to edge-illuminate the reticle 60 with an LED. Even so, the reticle 60 would not have to be etched because it would be recorded in three-dimensional space onto holographic film at the time of manufacture.

Alternatively, the fixed optical reticle 60 may be an etched pattern on glass. It could also be bonded/fused to the faceplate of the display 50 so that reticle 60 and display 50 are in the same focal plane. A glass reticle 60 can be edge-illuminated with and LED. Mechanical adjusters may be used to boresight the fixed reticle pattern. The display 50 can show a selection of other "electronic reticle" aiming patterns, each one coaxial with the fixed glass reticle 60 pattern.

Night-vision device 100 may also be employed for operation of sight 10 at night and be positioned at an exit pupil 90. Sight 10 has a reticle brightness that can be lowered to a relatively low, night-vision device compatible level. When an eye 110 of an operator is positioned at exit pupil 90, the operator sees through night-vision device 100 a superimposed light-intensified thermal image generated by thermal imager 80 and optical sight 20. Once again, the thermal image generated by thermal imager 80 can be used by the operator to cue warm targets such as human bodies and the high-resolution light-intensified direct view image generated by sight 20 can be used by the operator for target recognition, identification, and aiming. For example, night-vision device 100 may be a night vision monocular, such as the AN/PVS-14 or MUM-14A.

Thus, multi-mode sight 10 can be a fused thermal and a direct view aiming sight. It can have a thermal imager, an optical weapon sight, and a spectral beam combiner. The sight can provide an image display having a thermal image superimposed on a direct view image for an operator to see. The optical gun sight generates a direct view image of an aiming point or reticle superimposed on a target scene. The thermal imager generates a thermal image of the target scene. The spectral beam combiner receives and passes the direct view image from the optical gun sight to the exit pupil and receives and reflects the thermal image from the thermal imager to the exit pupil such that the thermal image is superimposed onto the direct view image of the optical gun sight for an operator to see as a superimposed thermal and direct view image when the operator positions an eye at the exit pupil. A red or amber color monochromic thermal image cues all the warm targets in the field of the direct view image of the weapon sight. The thermal imager and the optical weapon sight can further function with a night-vision device positioned at the exit pupil to provide a light-intensified superimposed thermal and direct view image for an operator to see during night-time use.

Other Implementations

There are many implementations of a multi-mode sight.

Figure 2:
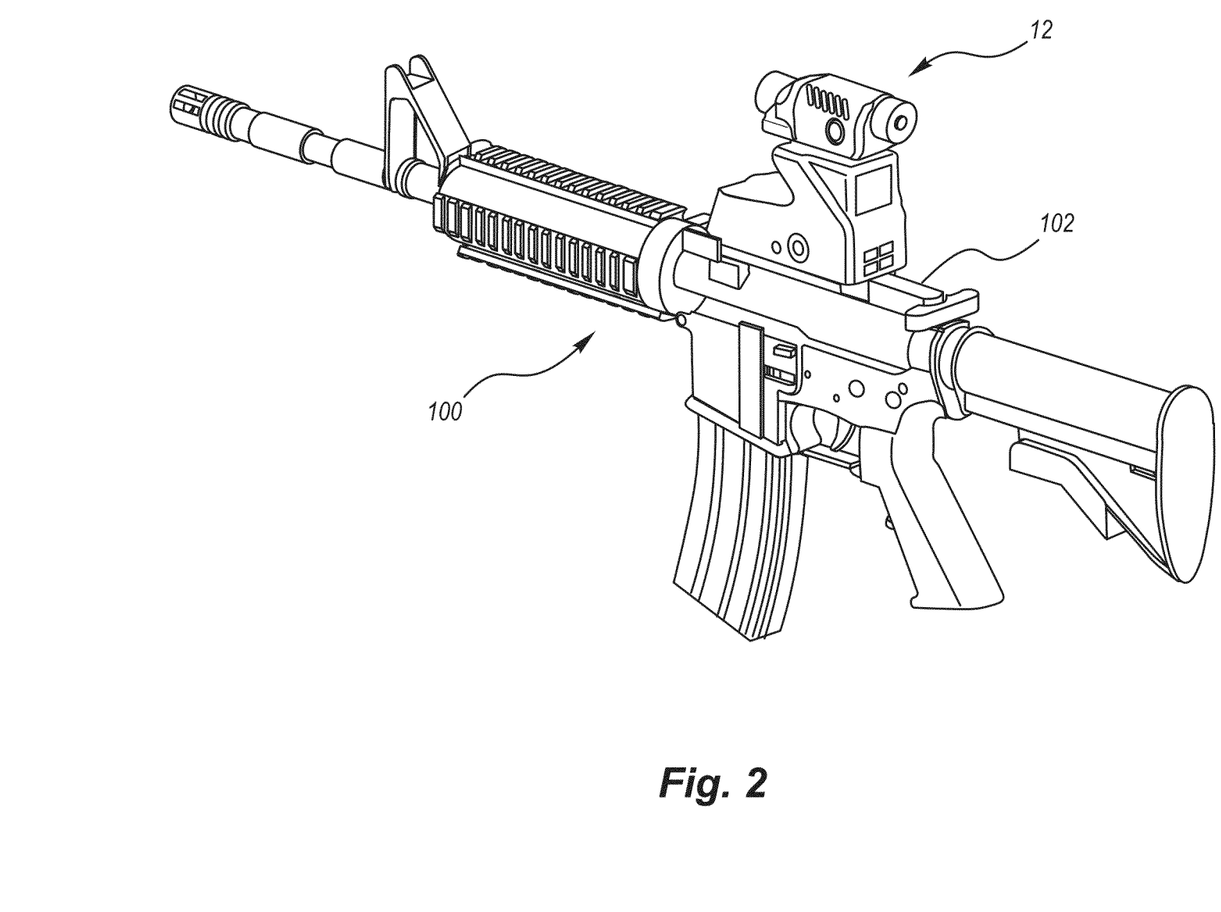
FIG. 2 is a side perspective view of another multi-mode sight implementation mounted on a firearm.
Figure 3:
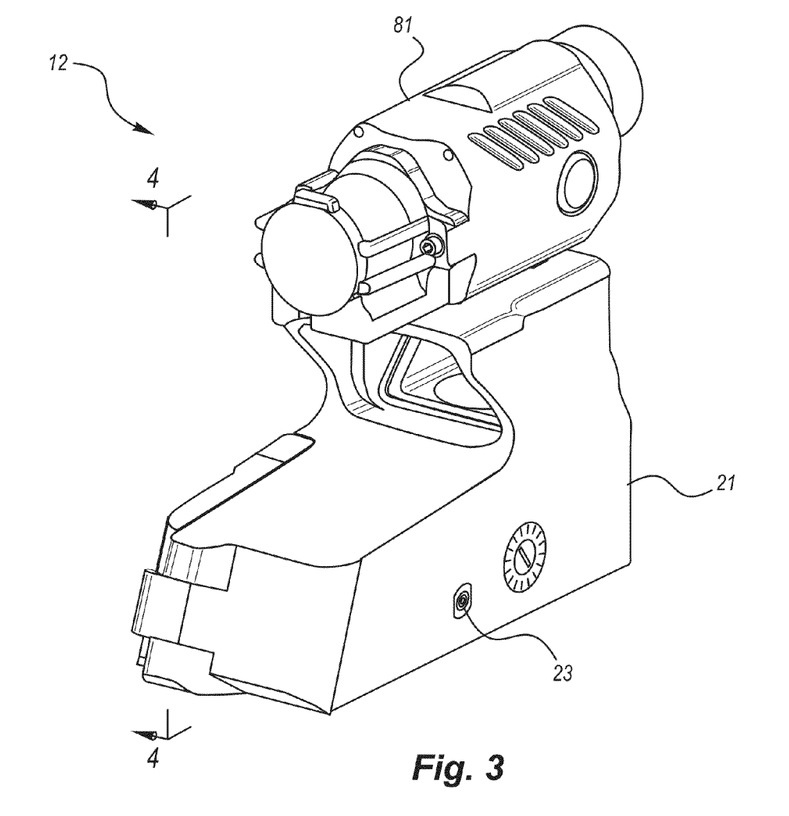
FIG. 3 is a front perspective view of the multi-mode sight of FIG. 2.
Figure 4:
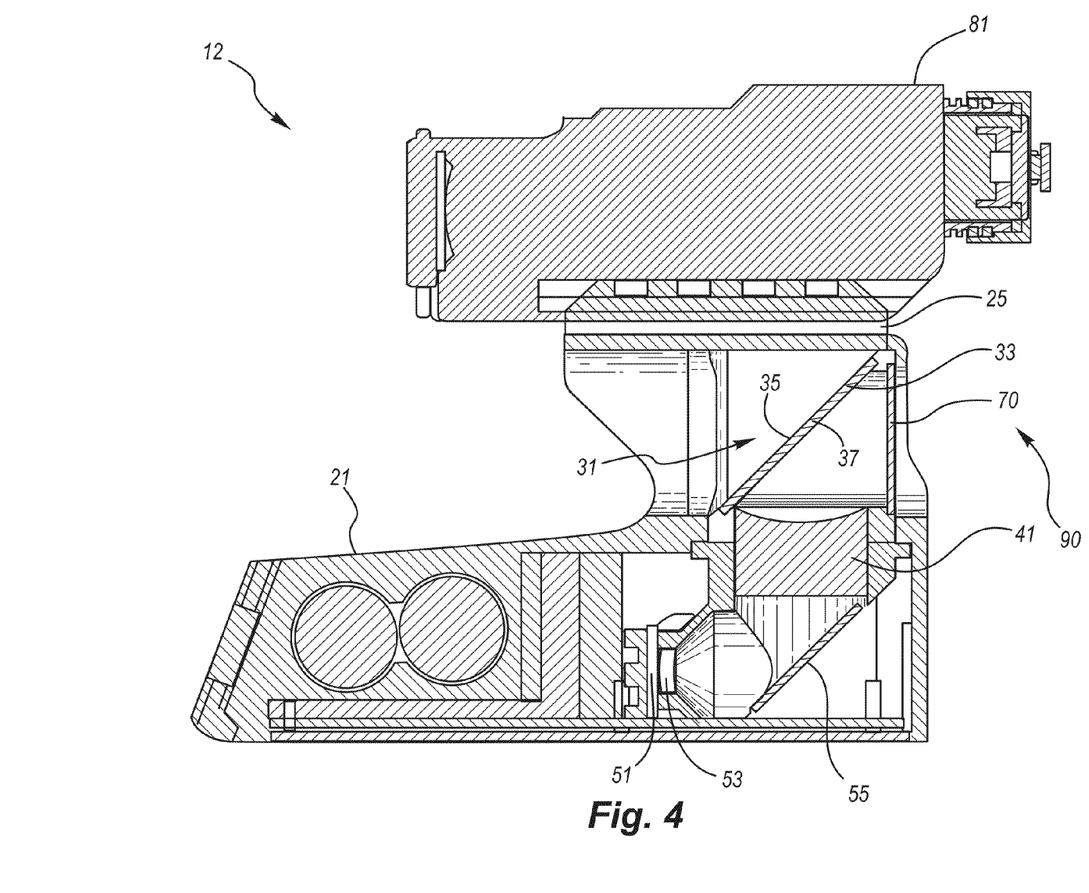
FIG. 4 is a cross-sectional view of the multi-mode sight of FIG. 2 taken along line 4-4 of FIG. 3.
Figure 5:
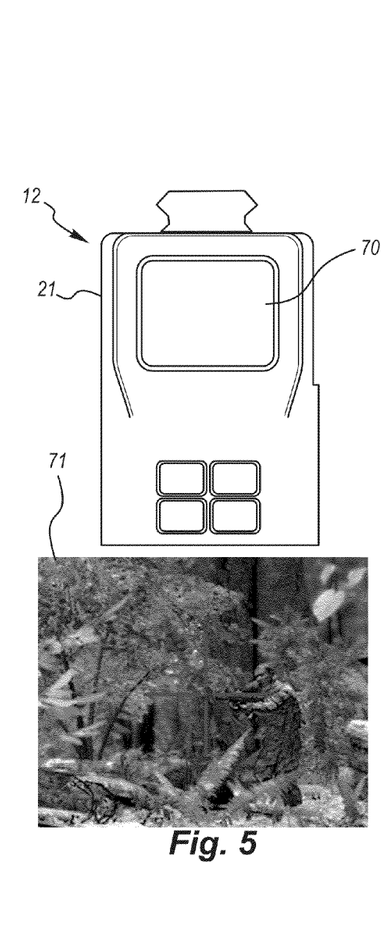
FIGS. 5-7 are rear views of the multi-mode sight of FIG. 2 in three day display modes of operation.
Figure 6:
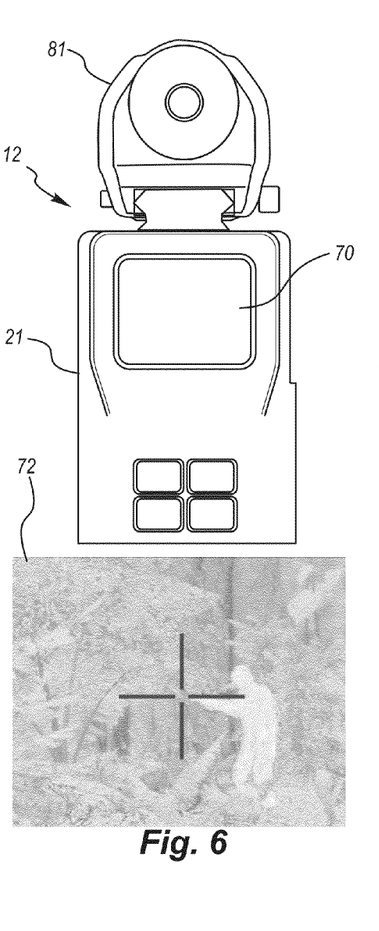
Figure 7:
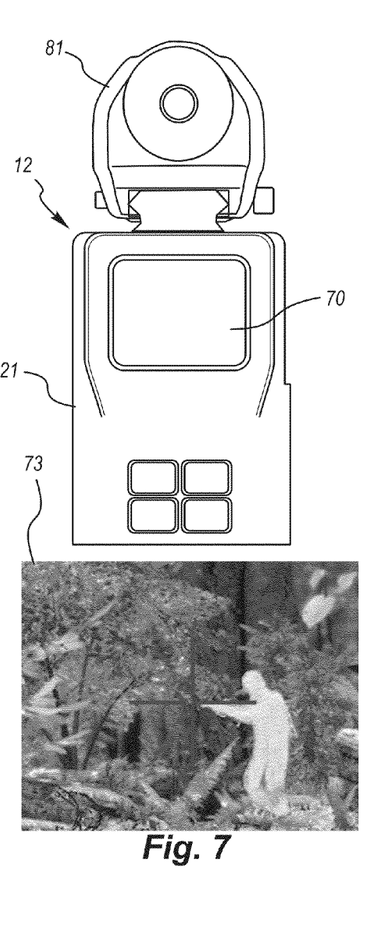
Figure 8:
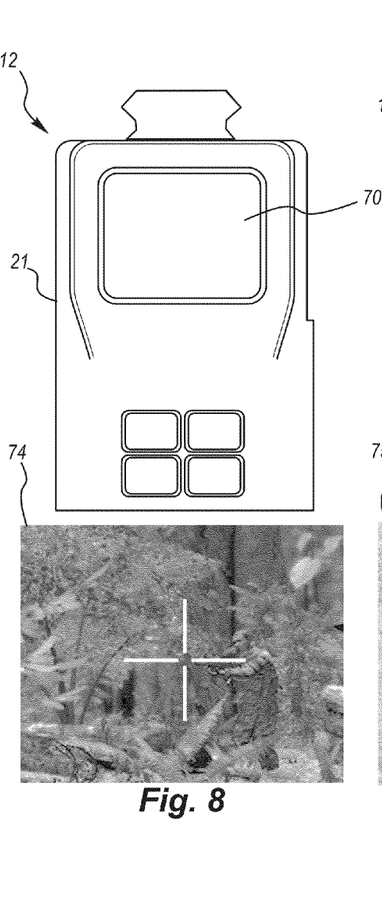
FIGS. 8-10 are rear views of the multi-mode sight of FIG. 2 in three night display modes of operation.
Figure 9:
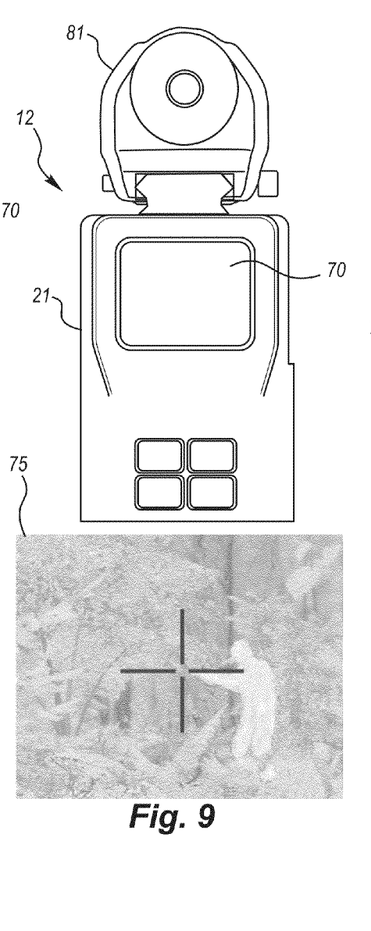
Figure 10:
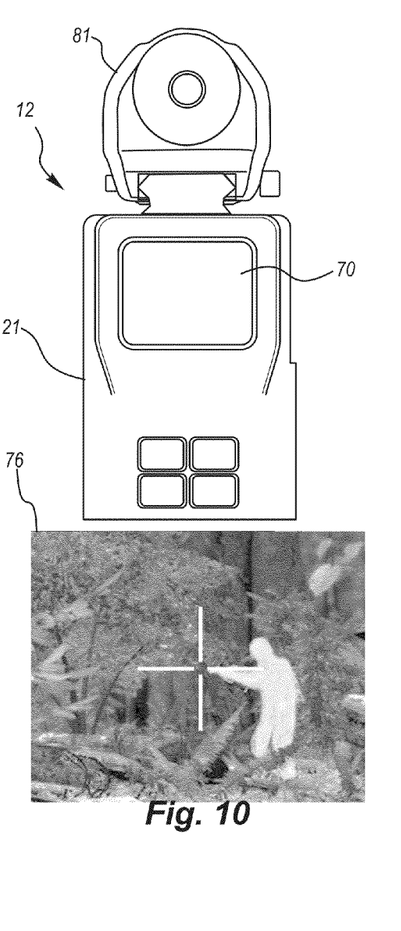

For the exemplary purposes of this disclosure and referring to FIGS. 2-4, multi-mode sight 12 is depicted in conjunction with a firearm 100. The primary function of multi-mode sight 12 may be as a day optical sight, mounted on a weapon accessory rail 102 for example (e.g., Picatinny or MIL-STD-1913 or STANAG).

Multi-mode sight 12 is similar to multi-mode sight 10 as previously described. Multi-mode sight 12 generally comprises an optical sight 21 with a single optical path there through and a video in port 23, a combiner 31 in the optical path, a lens 41 adjacent the combiner, a display 51, and a separate thermal imager 81 removably mounted to sight 21 via rail 25.

Optical sight 21 provides a direct view image of an aiming point or reticle superimposed on a target scene. The single optical path defined through sight 21 may be a direct view and overlay path.

Thermal imager 81 includes thermal imaging processing electronics and a thermal sight for generating a monochromic near infrared or thermal image of a target scene. The thermal imager 81 is controllable to be turned-off such that the direct view image provided from the optical sight 21 is passed to the exit pupil 90 without a thermal image superimposed thereon when the thermal imager 81 is turned-off. Thermal imager 81 may be a Long Wave infrared (LWIR) (8 µm to 12 µm) thermal camera component which provides video output to the display 51.

Single see-through combiner 31 is located/positioned in the optical path. Combiner 31 provides a view of the target scene with or without a super-imposed infinity focused image from display 51. Combiner 31 may comprise a plate or pellicle beamsplitter 33. A front surface 35 may have a dichroic coating that is adapted to transmit visible light. The back surface 37 of the mirror has another dichroic coating applied thereto that is adapted to reflect another portion of the visible spectrum. The combination of the two dichroic coatings on the front and back surfaces 35 and 37 respectively of beamsplitter 33 permits an image transmitted by visible light to pass through combiner 30.

Electronic display 51 is viewed by combiner 31. A moveable electronic aiming point or reticle overlaid on display 51 provides an aiming mark for the weapon user. Display 51 is structured to display the image received by the sensor of thermal imager 81 using a portion of the visible spectrum. Display 51 may be an inverting fiber optic output display, an LCD display, a micro mirror array, a CRT, a plasma display, or an OLED display for example.

Display 51 is located where the image will be reflected by the back surface 37 of beamsplitter 33 of combiner 31, along the defined optical path. The display 51 may therefore be positioned so that an image displayed by the display 51 and reflected by the back surface 33 will be overlaid upon the visible light image transmitted through the combiner 31. The user may vary the intensity of the image displayed by the display 51, thereby permitting the user to view through the output window 70 the visible light image alone, a combined image combining the image from the thermal imager 81 with the daylight image, or the image from the thermal imager 81 alone.

Collimating lens 41 is situated at 90° to the optical path. Lens 41 and the overlay image or reticle at its focus on display 51 together creates an optical collimator that produces a virtual image of that reticle. The image is reflected off combiner 31 so that the observer (looking through combiner 31) will see the image at the focus of the collimating optics superimposed in the sight's field of view in focus at ranges up to infinity.

Mirror 55 receives and reflects the thermal image from the display 51/lens 53 to lens 41. Lens 41 collimates the thermal image and passes it to combiner 31. Combiner 31 passes the direct view image from the optical gun sight 21 through output window 70 to the exit pupil and reflects the thermal image from combiner 31 through output window 70 to the exit pupil in order to superimpose the thermal image onto the direct view image for the operator to see as a superimposed image at the output window 70 composed of a monochromic thermal image and a direct view image of the target scene together with the aiming reticle.

A night-vision device may also be employed for operation of sight 12 at night and be positioned at an exit pupil 90.

Further implementations are within the CLAIMS.

Specifications, Materials, Manufacture, Assembly

It will be understood that implementations are not limited to the specific components disclosed herein, as virtually any components consistent with the intended operation of a multi-mode sight implementation may be utilized. Accordingly, for example, although particular components and so forth, are disclosed, such components may comprise any shape, size, style, type, model, version, class, grade, measurement, concentration, material, weight, quantity, and/or the like consistent with the intended operation of a multi-mode sight implementation. Implementations are not limited to uses of any specific components, provided that the components selected are consistent with the intended operation of a multi-mode sight implementation.

Accordingly, the components defining any wireless headset holder implementation may be formed of any of many different types of materials or combinations thereof that can readily be formed into shaped objects provided that the components selected are consistent with the intended operation of a multi-mode sight implementation. For example, the components may be formed of: rubbers (synthetic and/or natural) and/or other like materials; glasses (such as fiberglass), carbon-fiber, aramid-fiber, any combination thereof, and/or other like materials; polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; composites and/or other like materials; metals, such as zinc, magnesium, titanium, copper, iron, steel, carbon steel, alloy steel, tool steel, stainless steel, spring steel, aluminum, any combination thereof, and/or other like materials; alloys, such as aluminum alloy, titanium alloy, magnesium alloy, copper alloy, any combination thereof, and/or other like materials; any other suitable material; and/or any combination thereof.

Various multi-mode sight implementations may be manufactured using conventional procedures as added to and improved upon through the procedures described here. Some components defining multi-mode sight implementations may be manufactured simultaneously and integrally joined with one another, while other components may be purchased pre-manufactured or manufactured separately and then assembled with the integral components.

Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener, wiring, any combination thereof, and/or the like for example, depending on, among other considerations, the particular material forming the components.

It will be understood that the assembly of multi-mode sight implementations are not limited to the specific order of steps as disclosed in this document. Any steps or sequence of steps of the assembly of multi-mode sight implementations indicated herein are given as examples of possible steps or sequence of steps and not as limitations, since various assembly processes and sequences of steps may be used to assemble multi-mode sight implementations.

Use/Operation

Implementations of multi-mode sights are particularly useful in combat applications, specifically for small arms, as previously explained and depicted. However, implementations are not limited to uses relating to small firearms. Rather, any description relating to small firearms is for the exemplary purposes of this disclosure, and implementations may also be used in a variety of applications with similar results, such as any aiming application, like laser viewing systems for example.

For the exemplary purposes of this disclosure and describing the use of multi-mode sight implementations further, reference is made to FIGS. 5-10.

Sight 12 is capable of multi-spectral operation and provides directed small arms fire under a variety of different operating modes, examples of which are set forth in the following Table 1 and depicted in corresponding FIGS. 5-10.

TABLE 1

Day/Night/Thermal Operating Display Modes and Features

| Operating Mode | Day Sight (Reflex Sight) | Thermal Sight Only | Day Sight With Thermal Overlay Day Scene | Night Vision (Clip-on NVM) | Night Vision (Clip-on NVM) With Thermal Overlay Night Scene |
|---|---|---|---|---|---|
| Usage | Day | Day/Night | Day | Night | Night |
| See Through | Yes | No | Yes | Yes | Yes |
| HFOV, Degrees | 16 | 16 | 16 | 40 | 40 |
| Magnification | 1.0× | 1.0× | 1.0× | 1.0× | 1.0× |
| Display Color | — | Amber | Amber (outline mode) | — | Green |

TABLE 1-continued

Day/Night/Thermal Operating Display Modes and Features

| Operating Mode | Day Sight (Reflex Sight) | Thermal Sight Only | Day Sight With Thermal Overlay Day Scene | Night Vision (Clip-on NVM) | Night Vision (Clip-on NVM) With Thermal Overlay Night Scene |
|---|---|---|---|---|---|
| Display Reticle Color | Red | Red | Red | White | White |
| Controls Adjustment | — Reticle select Reticle H and V Reticle Brightness | Range Focus - IR Reticle select Reticle H and V Reticle Brightness IR Brightness | Range Focus - IR Reticle select Reticle H and V Reticle Brightness IR Brightness | Range Focus - I²2 Reticle select Reticle H and V Reticle Brightness | Range Focus - I²2 Range Focus - IR Reticle select Reticle H and V Reticle Brightness IR Brightness |
| Battery Life | >100 hrs | >4 hrs | >4 hrs | >100 hrs | >4 hrs |
| Range | 500 m | 300 m | 200 m | 350 m | 200 m |

In use, the visible light entering sight 12 will pass through surface 35 of beamsplitter 33 of combiner 31 and the output window 70, going directly to the user or to other optical devices like a night-vision device before going to the user. A thermal image from thermal imager 81 is converted to a visible light image and displayed on the display 51. The visible light emitted by the display 51 passes through the lens 53, the mirror 55, and the lens 41 striking the back surface 37 beamsplitter 33 of combiner 31. The image from the display 51 is overlaid upon the visible light image so that a single image is formed and displayed either directly to the user or to other optical devices, with substantially no perceptible difference between the two images from which the single superimposed image is formed.

For sight 12, under Normal Day Operation (Reflex Sight) (FIG. 5), the user looks directly through output window 70 and the combiner 31 at direct view optical image 71 of a target scene. An illuminated aiming reticle is superimposed on the target, to provide an aiming mark for directing weapon fire.

Under Day Thermal Operation (FIG. 6), with the thermal imager 81 installed, a video image 72 of the thermal scene is projected through combiner 31 and output window 70. For a stand-alone thermal image of the scene (indirect view) the see-through channel (optical path) is closed. Camouflages are designed to blend into the background in the visible to near infrared (400 nm to 900 nm) spectral region. As depicted, thermal imager 81 operating in the LWIR (8 μm to 12 μm) spectral range can detect warm well-camouflaged bodies such as human beings. An illuminated aiming reticle is superimposed on the target, to provide an aiming mark for directing weapon fire.

Under Thermal overlay of Day scene operation (FIG. 7), for an overlay of the thermal image on the direct view scene (image 73), the see-through channel (optical path) is open, and the display brightness of the thermal image is adjusted to provide contrast of the thermal image against the day scene. An illuminated aiming reticle is superimposed on the target, to provide an aiming mark for directing weapon fire.

Under Clip-on Night Vision mode (FIG. 8), a night vision monocular, such as the AN/PVS-14 or MUM-14A, is attached behind the multi-mode sight 12 and will provide imagery 74 of the night scene, with the aiming reticle superimposed to provide an aiming mark for directing weapon fire.

Under Night Thermal Operation (FIG. 9), with the thermal imager 81 installed, a video image of the thermal scene is projected through combiner 31 and output window 70. For a stand-alone thermal image of the scene (indirect view) the see-through channel (optical path) is closed. Camouflages are designed to blend into the background in the visible to near infrared (400 nm to 900 nm) spectral region. As depicted, thermal imager 81 operating in the LWIR (8 μm to 12 μm) spectral range can detect warm well-camouflaged bodies such as human beings. An illuminated aiming reticle is superimposed on the target, to provide an aiming mark for directing weapon fire.

Under Clip-on Night Vision Fused mode (FIG. 10), when both the NV monocular and the thermal imager 81 are installed and operated, the see-through channel (optical path) is open, and the display brightness of the video image is adjusted to provide contrast of the thermal image against the night scene. The user viewing through the NV monocular will see an intensified image 76 of the target scene, with thermal imagery and the aiming reticle superimposed.

There can also be another mode of operation not shown—Video Input (e.g. map, TXT message, video feed, etc.) through port 23.

In places where the description above refers to particular implementations, it should be readily apparent that a number of modifications may be made without departing from the spirit thereof and that these implementations may be alternatively applied. The accompanying CLAIMS are intended to cover such modifications as would fall within the true spirit and scope of the disclosure set forth in this document. The presently disclosed implementations are, therefore, to be considered in all respects as illustrative and not restrictive, the scope of the disclosure being indicated by the appended CLAIMS rather than the foregoing DESCRIPTION. All changes that come within the meaning of and range of equivalency of the CLAIMS are intended to be embraced therein.

The invention claimed is:

1. A multi-mode sight consisting essentially of:
   an optical sight that provides a direct view image of an aiming point or reticle superimposed on a target scene;
   a thermal imager that provides a monochromic thermal image of the target scene;
   a single, superimposed direct view and thermal optical image path defined through the optical sight;
   a single combiner in the single, superimposed direct view and thermal optical image path that passes the direct view image and reflects the thermal image such that the thermal image is superimposed onto the direct view image to form a superimposed thermal and direct view optical image of the target scene together with the aiming point or reticle; and a night-vision device positioned at an exit pupil, wherein the night-vision device light-intensifies the superimposed thermal and direct view optical image of the target scene together with the aiming point or reticle for nighttime use.

2. The multi-mode sight of claim 1, wherein the thermal imager provides video output to a display.

3. The multi-mode sight of claim 1, wherein the optical sight is a non-magnified reflex optical sight.

4. A fused thermal and direct view multi-mode aiming sight configured to mount onto a weapon for use as a day/night/thermal sight, the multi-mode aiming sight consisting essentially of:

an optical sight that provides a direct view image of an aiming point or reticle superimposed on a target scene;

a thermal imager that provides a monochromic thermal image of the target scene;

a single, superimposed direct view and thermal optical image path defined through the optical sight; and a single combiner in the single, superimposed direct view and thermal optical image path that passes the direct view image and reflects the thermal image such that the thermal image is superimposed onto the direct view image to form a superimposed thermal and direct view optical image of the target scene together with the aiming point or reticle; and a night-vision device positioned at an exit pupil, wherein the night-vision device light-intensifies the superimposed thermal and direct view optical image of the target scene together with the aiming point or reticle for nighttime use.

5. The multi-mode sight of claim 4, wherein the thermal imager provides video output to a display.

6. The multi-mode sight of claim 4, wherein the optical sight is a non-magnified reflex optical sight.

* * * * *